United States Patent
Ladouceur et al.

(10) Patent No.: US 8,332,000 B2
(45) Date of Patent: Dec. 11, 2012

(54) HANDHELD ELECTRONIC DEVICE HAVING A SLIDE-AND-TWIST MECHANISM

(75) Inventors: Norman Miner Ladouceur, Waterloo (CA); Jason Tyler Griffin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 571 days.

(21) Appl. No.: 12/577,952

(22) Filed: Oct. 13, 2009

(65) Prior Publication Data
US 2011/0086681 A1    Apr. 14, 2011

(51) Int. Cl.
*H04M 1/00*    (2006.01)
(52) U.S. Cl. .................... 455/575.4; 455/575.1; 455/566
(58) Field of Classification Search .... 455/575.1–575.4, 455/566, 575.8
See application file for complete search history.

(56) References Cited

U.S. PATENT DOCUMENTS

| | | | | |
|---|---|---|---|---|
| 2008/0084659 | A1* | 4/2008 | Misawa | ........................ 361/681 |
| 2009/0231785 | A1 | 9/2009 | Li et al. | |

FOREIGN PATENT DOCUMENTS

| | | |
|---|---|---|
| CN | 1652547 A | 8/2005 |
| EP | 1931118 A2 | 6/2008 |
| EP | 1944949 A1 | 7/2008 |
| GB | 2417851 A | 3/2006 |
| JP | 2003298694 A | 10/2003 |

OTHER PUBLICATIONS

EESR of the corresponding EP Patent Application No. 09172849.3 mailed Feb. 4, 2010.

* cited by examiner

*Primary Examiner* — Christian Hannon
(74) *Attorney, Agent, or Firm* — Ridout and Maybee LLP

(57) ABSTRACT

A handheld electronic device having a slide-and-twist mechanism for changing between multiple device positions is provided. A slide-and-twist style form factor allows the device configuration and/or exposed input devices to be changed by the device user. The different device positions may support different operational modes or uses of the device by exposing different input devices. In accordance with one embodiment, there is provided a handheld electronic device, comprising: a first body having a first face and a second face; a second body having a first face and a second face, the first and second input devices being located on the first face of the second body; the first body being connected to the second body for sliding movement between a closed position and a first open position, wherein in the closed position the first body covers at least a portion of the second body, and wherein in the first open position the first input device is exposed on the first face of the second body; and wherein the second body is rotatable relative to the first body between the first open position and a second open position, wherein in the second open position the second input device is exposed on the first face of the second body.

25 Claims, 8 Drawing Sheets

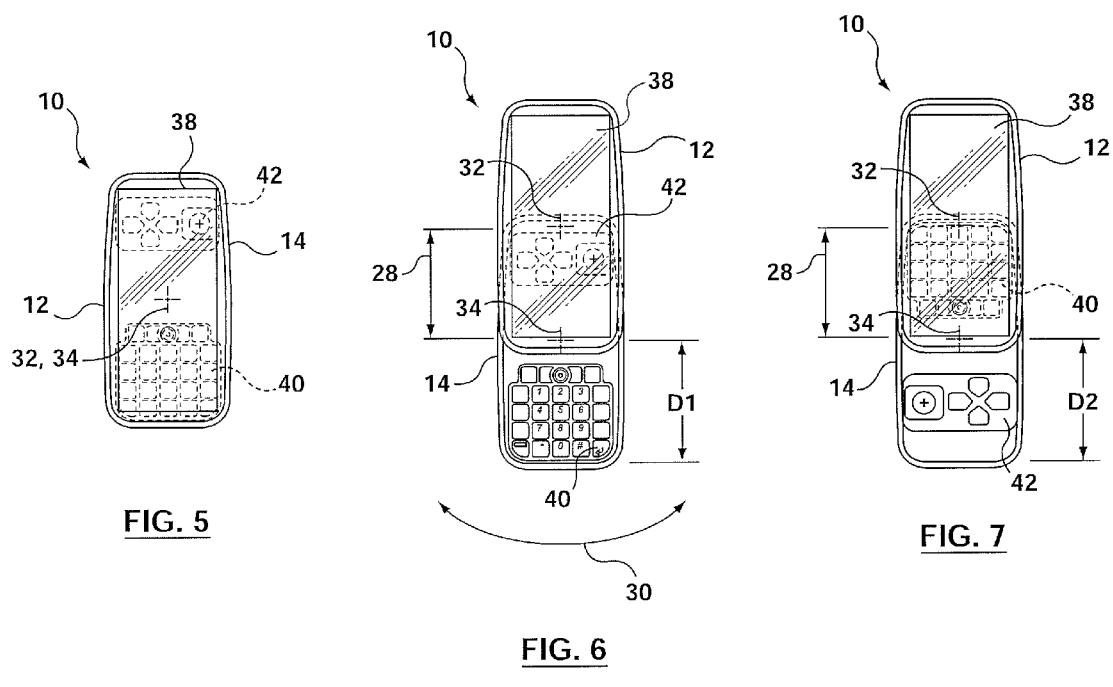

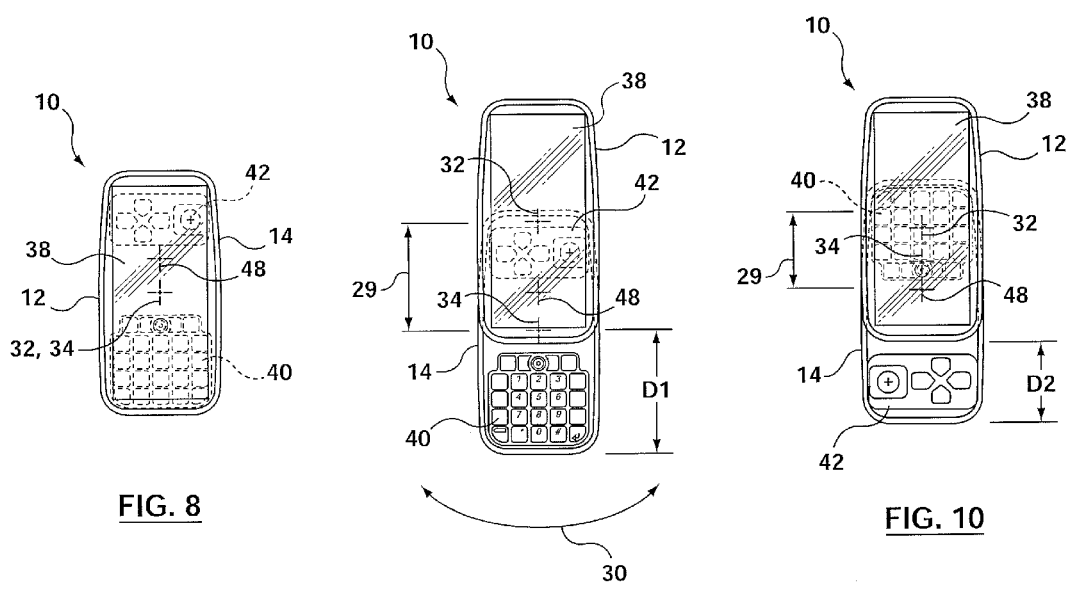

HANDHELD ELECTRONIC DEVICE HAVING A SLIDE-AND-TWIST MECHANISM

TECHNICAL FIELD

The present disclosure relates generally to handheld electronic devices, and more particularly to a handheld electronic device having a slide-and-twist mechanism.

BACKGROUND

Handheld electronic devices are designed with input devices and form factors that best support the intended use(s) of such devices. For example, handheld electronic devices may be provided with a keyboard, keypad, touchpad, gamepad, touchscreen or combination of such input devices. Similarly, handheld electronic devices may have a rigid form factor such as a bar or brick form factor, or a moving form factor such as a slider, twist or flip form factor. Moving form factors allow device users to transform the device from one form factor to another by sliding, twisting or otherwise moving parts of the device to present alternative keypads to the user.

Moving form factors such as slider phones and flip phones offer a variety of interfaces, but are typically limited to an open and closed device position. In addition, the software and uses of handheld electronic devices are constantly evolving. Existing form factors and input interfaces provided by these form factors may be limiting in view of new device software and uses.

BRIEF DESCRIPTION OF THE DRAWINGS

FIG. 5 is a diagrammatic top view of the device of FIG. 1 in the closed position;

FIG. 6 is a diagrammatic top view of the device of FIG. 1 in the first open position;

FIG. 7 is a diagrammatic top view of the device of FIG. 1 in the second open position;

FIG. 8 is a diagrammatic top view of a second example embodiment of a slide-and-twist style handheld electronic device in a closed position;

FIG. 9 is a diagrammatic top view of the device of FIG. 8 in a first open position;

FIG. 10 is a diagrammatic top view of the device of FIG. 8 in a second open position;

Like reference numerals are used in the drawings to denote like elements and features. Dotted lines in the drawings are used to show hidden features.

DETAILED DESCRIPTION OF EXAMPLE EMBODIMENTS

Figure 1:
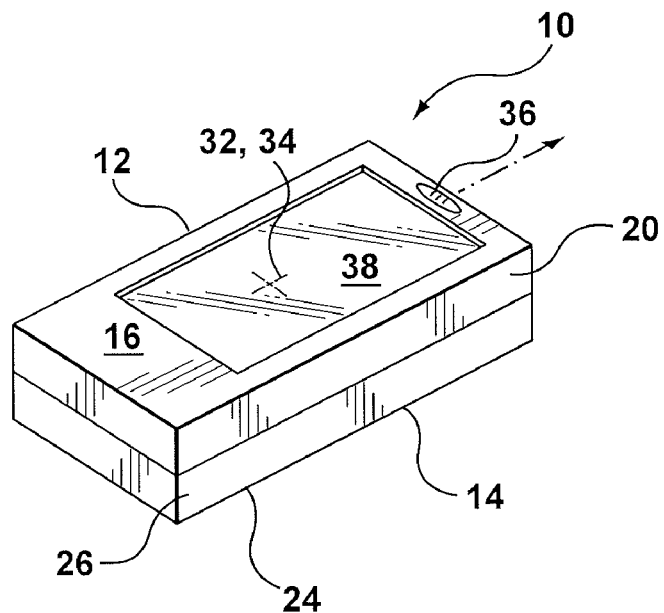
FIG. 1 is a diagrammatic perspective view of a first example embodiment of a slide-and-twist style handheld electronic device in a closed position.
Figure 2:
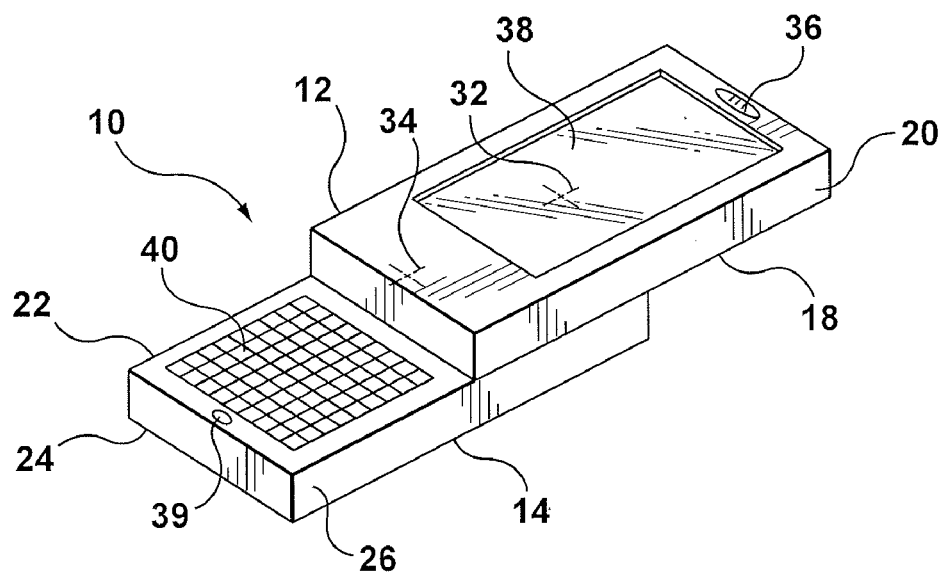
FIG. 2 is a diagrammatic perspective view of the device of FIG. 1 in a first open position.
Figure 3:
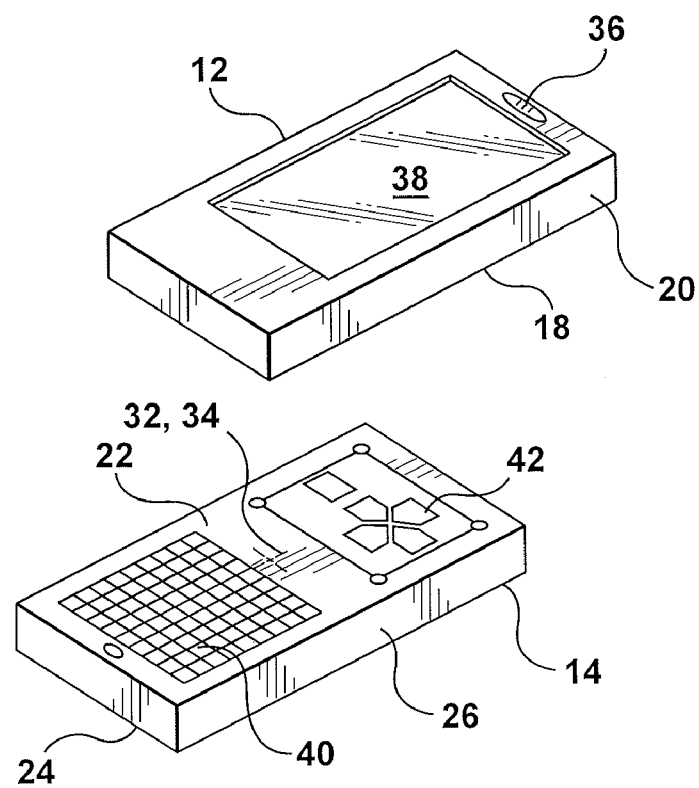
FIG. 3 is a diagrammatic exploded view of the device of FIG. 1 in the first open position.
Figure 4:
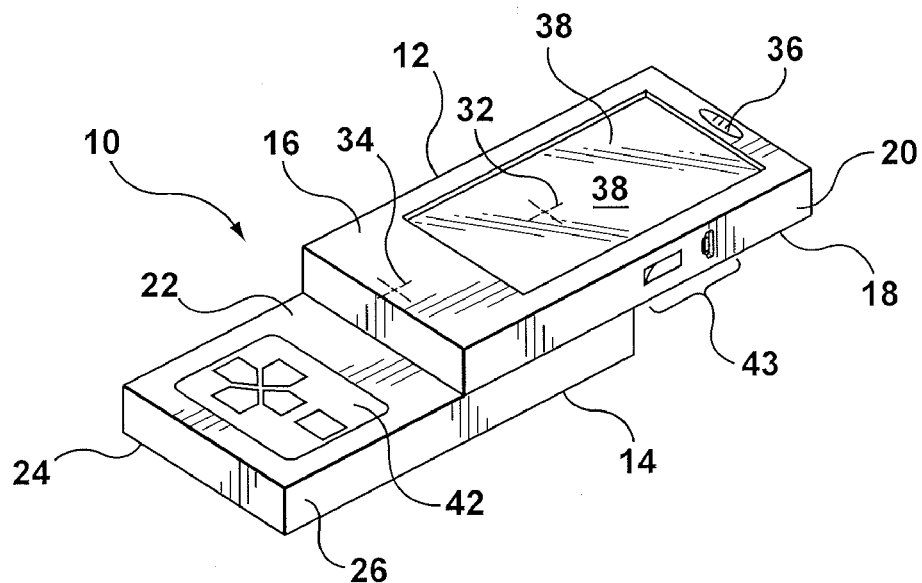
FIG. 4 is a diagrammatic perspective view of the device of FIG. 1 in a second open position.

The present disclosure provides a handheld electronic device having a slide-and-twist mechanism for changing between multiple device positions. A slide-and-twist style form factor allows the device configuration and/or exposed input devices to be changed by the device user. The different device positions may support different operational modes or uses of the device by exposing different input devices.

In accordance with one example embodiment of the present disclosure, there is provided a handheld electronic device, comprising: a controller; a first input device connected to the controller; a second input device connected to the controller; a first body having a first face and a second face; a second body having a first face and a second face, the first and second input devices being located on the first face of the second body; the first body being connected to the second body for sliding movement between a closed position and a first open position, wherein in the closed position the first body covers at least a portion of the second body, and wherein in the first open position the first input device is exposed on the first face of the second body; and wherein the second body is rotatable relative to the first body between the first open position and a second open position, wherein in the second open position the second input device is exposed on the first face of the second body.

In some embodiments, a display screen is provided on the first face of the first body, and the first and second input device are each one of a full keyboard, reduced keyboard, numeric keypad, touchpad, touchscreen, navigation pad, Internet browser keypad, gaming keypad, media playback keypad or camera keypad; and wherein the first and second input device are different. In some embodiments, the first input device is a full keyboard, reduced keyboard or numeric keypad, and the second input device is a navigation pad, Internet browser keypad, gaming keypad, media playback keypad or camera keypad. In some embodiments, the display screen is a touchscreen providing a further input device.

In some embodiments, the device further comprises: a third input device connected to the controller; wherein the second body is rotatable relative to the first body between the first open position and a third open position, wherein in the third open position the third input device is exposed on the first face of the second body. In some embodiments, wherein the second body is rotatable in a first direction relative to the first body between the first open position and the second position, and wherein the second body is rotatable relative in a second direction to the first body between the first open position and the third open position. In some embodiments, the first direction is clockwise and the second direction is counterclockwise.

In some embodiments, the first and second bodies are generally cylindrical in shape, the first and second faces of the first and second bodies being generally circular in shape, and the device further comprises: a rotatable outer ring disposed on the one of the first and second bodies, the outer ring being rotatable about a peripheral edge surface thereof and having openings formed therein for selectively exposing one or more interface ports located in the peripheral edge surface.

In some embodiments, the device further comprises: a further input device on the first face of the first body. In some embodiments, the first and second bodies are generally cylindrical in shape, the first and second faces of the first and second bodies being generally circular in shape, the device further comprising a rotatable outer ring disposed on the one of the first and second bodies, the outer ring having a predetermined position in which at least one of the first, second or further input devices is disabled. In some embodiments, the further input device is disabled when the outer ring is moved into the predetermined position.

In some embodiments, the first body has a convex sliding surface on which the second face of the first body is located, and the second body has a correspondingly shaped concave sliding surface on which the first face of the second body is located, wherein the first body is connected to the second body for sliding movement between the closed position and the first open position along the convex and concave sliding surfaces. In some embodiments, the first face of the first body lies in a first plane in the closed position, the first face of the first body lying in a second plane in the first open position, the second plane being disposed at an acute angle with respect to the first plane. In some embodiments, the first face of the first body remains in the second plane when the device is in the second open position.

Referring now to the drawings, FIGS. 1 to 7 illustrate a handheld electronic device 10 having a slide-and-twist style form factor in accordance with a first embodiment of the present disclosure. The device 10 includes two body parts that are movable relative to each other between a closed (or neutral) position, a first open position and a second open position. These device positions may be associated with different operational modes of the device 10, such as a first, second and third mode of operation respectively.

The device 10 is a slide-and-twist-style device having a first (or top) body 12 and a second (or bottom) body 14. It will be understood that while the first body is referred to as the top body 12 and that the second body is referred to as bottom body 14, these references are used only for convenience based on a normal position in which the device 10 is held. The references to the top body 12 and bottom body 14 are not intended to be limiting. Furthermore, it will be understood that device 10 is shown schematically in the drawings for the purpose of illustration and that the thickness and size of the respective body parts may vary from that shown in the drawings and between different embodiments.

The top body 12 and bottom body 14 each comprise a rigid case housing device components. The top body 12 typically houses a speaker 36 and a display screen 38 while the bottom body 14 typically houses two or more input devices, a microphone 39 and the majority of the electronic circuitry for the device 10. However, it will be understood that the components housed within or carried by each of the bodies 12, 14 can vary between devices.

The device 10 may also be provided with one or more interface ports 43 (FIG. 4) such as input/output ports (e.g., jacks, ports or card slots). The location of the interface ports 43 typically depends on the respective type of interface. For example, a headset jack and USB port are typically located in a peripheral edge surface 20, 26 of the top body 12 or bottom body 14, respectively, as is known in the art, although the actual location of the interface ports 43 may vary between devices and interface types.

The top body 12 has first and second faces 16 and 18 respectively, with the peripheral edge surface 20 interconnecting the first and second faces 16, 18. Similarly, the bottom body 14 has first and second faces 22 and 24 respectively, with the peripheral edge surface 26 interconnecting the first and second faces 22, 24. In the shown embodiment, the first face 16 of the top body 12 and the first face 22 of the bottom body 14 are front faces, and the second face 18 of the top body 12 and the second face 24 of the bottom body 14 are back faces.

In the shown embodiment, a first input device 40 and a second input device 42 are provided on the first face 22 of the bottom body 14. In the shown embodiment, the speaker 36 is provided on the first face 16 of the top body 12 and the microphone 39 is provided on the first face 22 of the bottom body 14. When the device 10 is not a communication device, one or both of the speaker 36 or microphone 39 may be omitted.

The first face 16 of the top body 12 could be provided with an input device in some embodiments. The input device could be a touchscreen formed using the display screen 38 thereby providing the device user with an additional user interface when the device 10 is in the closed position. As will be appreciated to persons skilled in the art, a touchscreen display comprises a display screen, which could be the display screen 38, with a touch-sensitive input surface or overlay connected to an electronic controller. Alternatively, an input device such as a keypad could be provided in the first face 16 of the top body 12 when the display screen 38 is a touchscreen.

The top and bottom bodies 12, 14 are connected for sliding movement of the top and bottom bodies 12, 14 relative to each other between the closed position and the first open position. The sliding movement allows the overall length of the device 10 to be extended by moving the device 10 from the closed position to the first open position, or contracted by moving the device 10 from the first open position to the closed position. The sliding movement is typically linear movement as represented by the arrow 28 in FIGS. 6 and 7. However, the teachings of the present disclosure could be applied to non-linear sliding mechanisms and multi-direction sliding mechanisms. For example, the sliding movement could be caused by transformation or movement along a non-linear channel or track. The non-linear track could comprise a series of linear tracks of different orientations (e.g. up, left, up) to define a non-linear path of movement from one end of the track to the other.

The bottom body 14 has first and second faces 22, 24 interconnected by peripheral edge surface 26. The bottom body 14 also has a geometric centre 34. The top body 12 also has a geometric centre 32. In the closed position, the respective geometric centres 32, 34 of the top body 12 and bottom body 14 are substantially aligned. In the shown embodiment, no input device is exposed in the closed position. In the first open position, the first input device 40 is exposed on the first face 22 of the bottom body 14.

In other embodiments, an input device may be provided and exposed in the closed position. The input device could be a touchscreen which takes the place of the display screen 38 or a supplemental keypad or keyboard below the display screen 38. The microphone 39, an audio input device, could also be provided on the first face 16 (e.g. front face) of the top body 14.

The top and bottom bodies 12, 14 are also connected for rotational or twisting movement of the bottom body 14 relative to the top body 12 between the first open position and the second open position and vice versa. In the second open position, the second input device 42 is exposed on the first face 22 of the bottom body 14. Alternatively, the top and bottom bodies 12, 14 could be connected for rotational or twisting movement of the top body 12 relative the bottom body 14. The rotational movement is represented by the arrow 30 in FIG. 6. In some embodiments, the second body 14 is rotatable relative to the first body 12 between the first open position and a second open position in a substantially 180 degree range. In other embodiments, such as that shown in FIG. 13, the bottom body 14 could be rotated 360 degrees relative to the top body 12, or vice versa. Each of the first and second open positions exposes a different area of the first face 22 of the bottom body 14. The rotational or twisting movement changes the exposed area of the first face 22 to expose a different user interface.

In the embodiment shown in FIGS. 1 to 7, the device 10 has a pivot point which is located at or near the centre of the top and bottom bodies 12, 14 and is substantially aligned with the geometric centres 32, 34 of the top body 12 and bottom body 14 respectively. However, in other embodiments the device 10 could have a pivot point which is off-centre. For example, the pivot point could be offset to the left or right of the geometric centres 32, 34 of the top body 12 and bottom body 14 respectively.

When the device 10 is in the closed position, the top body 12 covers substantially all of the first face 22 of the bottom body 14. However, it will be appreciated that in other embodiments some of the first face 22 may remain exposed when the device 10 is in the closed position. In some embodiments, in the closed position the first input device 40 and second input device 42 may be substantially covered by the top body 12. In some embodiments, in the first open position the first input device 40 is exposed while the second input device 42 is substantially covered by the top body 12. In some embodiments, in the second open position the second input device 42 is exposed while the first input device 40 is substantially covered by the top body 12.

The first and second input device 40, 42 are located at opposed ends of the first face 22 of the bottom body 14 in the shown embodiment. The first and second input device 40, 42 may be mounted to a printed circuit board (PCB) of the device 10 and extend through openings in the rigid casing of the bottom body 14. In at least some embodiments, the first input device 40 is mounted so as to be rotated 180 degrees relative to the second input device 42. That is, the first input device 40 has a working orientation which is rotated 180 degrees with respect to a working orientation of the second input device 42.

The first and second input device 40, 42 may each be one of a full keyboard, reduced keyboard, numeric keypad, touchpad, touchscreen, navigation pad, Internet browser keypad, gaming keypad, media playback keypad, camera keypad or other suitable input device. Typically, the first and second input devices 40, 42 are each different. In some embodiments, the first input device 40 could be a full keyboard (which could be configured in a familiar QWERTY, QWERTZ, AZERTY or Dvorak layout as is known in the art), a reduced keyboard such as that described in U.S. Pat. No. 7,224,292, issued May 29, 2007, or a numeric or telephone keypad such as a keypad layout based on the ITU standard (ITU E.161), whereas the second input device 42 could be a touchpad, a touchscreen, a navigation pad, an Internet browser keypad, a gaming keypad, a media playback keypad, a camera keypad, or other suitable input device.

In other embodiments, the display screen 38 is a touchscreen providing a further input device, the first input device 40 is a full keyboard, reduced keyboard or numeric keypad, and the second input device 42 is a navigation pad, Internet browser keypad, gaming keypad, media playback keypad or camera keypad.

When the device 10 is opened from the closed position to the first open position, the bottom body 14 slides linearly downwardly with respect to the top body 12 by means of a sliding mechanism (not shown). Many sliding mechanisms for handheld electronic devices are known to persons skilled in the art and will not be described in detail herein. Any suitable sliding mechanism may be used.

In one embodiment, the sliding mechanism could comprise a linear channel or track defined in the second face 18 of the top body 12 and a pin extending from the first face 22 of the bottom body 14 and received in the track (not shown). The pin extends from a central portion of the bottom body 14. The sliding mechanism and the portion in which the pin is located typically remain substantially hidden or covered between the first and second bodies 12, 14. The ends of the linear track define the bounds of sliding movement represented by the arrow 28. The geometric centres 32, 34 of the top body 12 and bottom body 14 are substantially aligned with the track. The diameter of the pin and the width of the track are mutually sized for smooth travel during movement of the pin along the track. The end of the pin includes a head or engaging member received within the first body interior to the second face 18 of the top body 12. The head of the pin acts as a cam during travel of the pin during linear sliding movement. This configuration allows the device 10 to slide open and closed regardless of the input device (e.g., the first input device 40 or second input device 42) which is exposed for the user to work with.

The sliding movement proceeds in the direction of the arrow 28 such that the geometric centre 34 of the bottom body 14 is displaced linearly downwardly with respect to the geometric centre 32 of the top body 12. As a result of the linear sliding movement, a portion (identified as D1 in FIG. 6) of the previously covered first face 22 of the bottom body 14 is exposed thereby allowing the user to access one or more input devices, such as a keypad or keyboard, that was previously hidden or inaccessible, while a portion of the first face 22 remains hidden or covered.

Once the device 10 is in the first open position, the bottom body 14 can be rotated 180 degrees about its geometric centre 34 with respect to the top body 12 to the second open position. In embodiments in which a pin and track are used for the sliding mechanism, the pin provides a pivot point for rotation. In some embodiments, the device 10 could be rotated without being in a fully open position such as the first open position. It is possible that the device 10 could be rotated within the closed position in some embodiments. In other embodiments, rotation of the device 10 may be limited to when it is in a fully open position such as the first open position or second open position.

When the device 10 is in the second open position, a portion (identified as D2 in FIG. 7) of the first face 22 of the bottom body 14 that remained hidden or inaccessible in the first open position becomes exposed allowing the user to access one or more additional and possibly different input devices (such as a different keypad or keyboard, or navigation controls) that were previously hidden or covered. The input devices that were available to the user in the first open position become hidden or covered in the second open position. It will be appreciated that when the bottom body 14 rotates or pivots about its geometric centre 34, the portion D1 of the first face 22 of the bottom body 14 that is exposed in the first open position (FIG. 6) is equal to the portion D2 of the first face 22 that becomes exposed in the second open position (FIG. 7). It will be appreciated that there are typically portions of the top and bottom bodies 12, 14 which always remain hidden or covered, such as the portions used by the sliding and rotating mechanisms.

It is also possible that a second closed position may be provided in some embodiments (not shown). In such embodiments, the device 10 may be closed from the second open position by sliding movement from the second open position to the second closed position. In the second closed position, the first body 12 would cover at least a portion of the second body 14, typically substantially all of the first body 12. The second closed position would appear very similar to the closed position shown in FIG. 1 with the exception that the second body 14 would be rotated 180 degrees relative to what is shown in FIG. 1. As a result, the location of the interface ports 43 (e.g., jacks, ports or card slots) would be different in the second closed position than in the closed position of FIG. 1.

In the shown embodiment of FIGS. 1 to 7, the device 10 does not expose or provide an input device in the closed position. However, as noted above an input device may be exposed in the closed position in other embodiments. When the device 10 is in the first open position, the first input device 40 is exposed and accessible to the device user while the second input device 42 is hidden or covered. When the device 10 is in the second open position, the second input device 42 is exposed and accessible to the device user while the first input device 40 is hidden or covered.

As noted above, the closed position (FIG. 1) may be associated with a first mode of operation of the device 10, the first open position (FIG. 2) may be associated with a second mode of operation of the device 10, and the second open position (FIG. 4) may be associated with a third mode of operation of the device 10. In some embodiments, a controller of the device 10 is configured to detect changes in device position and automatically change between the first, second and third operational modes of the device in accordance with the device position following a detected change in the device position. The process of changing the operational mode may comprise change the active application on the device 10 and/or changing the active input device(s) and possibly the active output devices.

For the purpose of illustration, in some embodiments the closed position may be associated with a view/visual only mode, audio only mode or audio-visual mode, depending which of the speaker 36 or non-touchscreen-based display screen 38 are provided. No input device is exposed when the device 10 is in the closed position (FIG. 1) so the use of the device 10 is limited to viewing visual content reproduced on the display screen 38 and/or listening to audio content reproduced via the speaker 36. The first open position may be associated with a communication mode (e.g., telephone or email mode) by exposing a numeric, full keyboard and/or reduced keyboard as the first input device 40. The second open position may be associated with a gaming mode by providing and exposing a gaming keypad as the second input device 42.

Referring now to FIGS. 8-10, a handheld electronic device having a slide-and-twist style form factor in accordance with a second embodiment of the present disclosure will be described. In this embodiment, the device 10 transitions from the closed position to the first open position by means of a sliding mechanism which allows the bottom body 14 to be displaced linearly downwardly with respect to the top body 12 as in the first embodiment. The sliding movement is typically linear movement as represented by the arrow 29 in FIGS. 9 and 10. By this movement, a portion (identified as D1 in FIG. 9) of the first face 22 of the bottom body 14 becomes exposed and the first input device 40 becomes accessible to the user. However, in this embodiment the bottom body 14 rotates or pivots about a point 48 offset from the geometric centre 34 of the bottom body 14. Therefore, the portion of the first face 22 of the bottom body 14 that becomes exposed as the device 10 transitions from the first open position to the second open position (identified as D2 in FIG. 10) is not the same size as the portion D1 of the first face 22 that is exposed in the first position. In the shown embodiment, the exposed portion D2 is smaller than the exposed portion D1. It will be appreciated that the sliding movement 29 required to expose the smaller exposed position D2 is shorter than the sliding movement 29 required to expose the larger exposed position D1 in the shown embodiment. Depending upon the particular application or mode of operation of the device, it may be desirable to have exposed areas of different size, for example for different size input devices.

Figure 11:
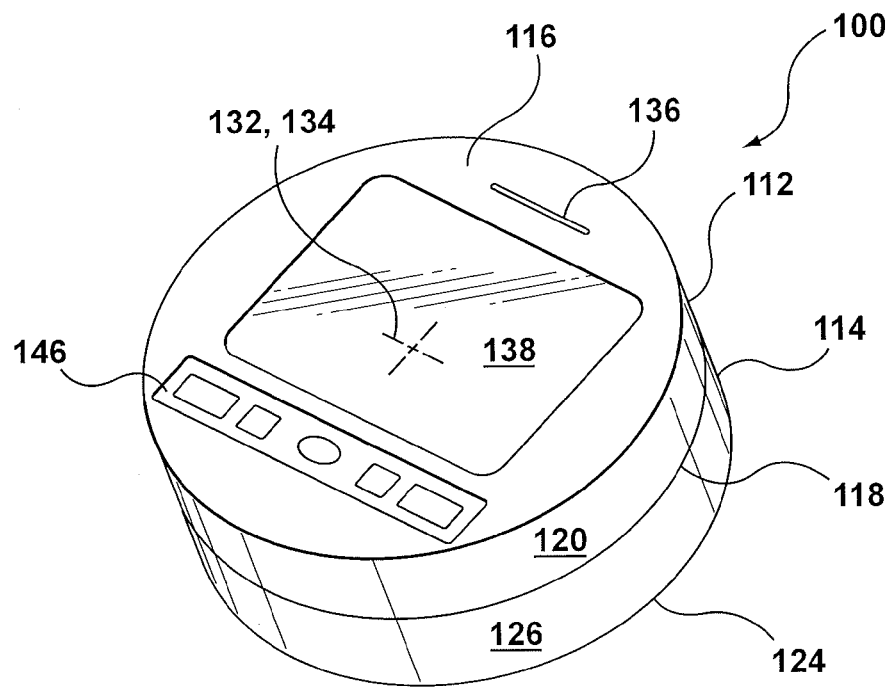
FIG. 11 is a diagrammatic perspective view of a third example embodiment of a slide-and-twist style handheld electronic device in a closed position.
Figure 12:
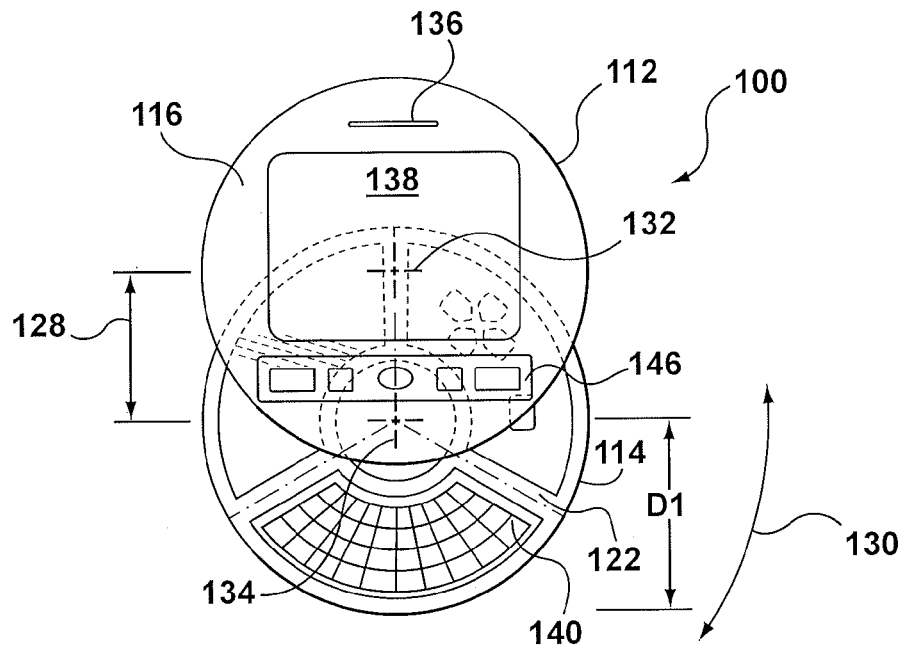
FIG. 12 is a diagrammatic top view of the device of FIG. 11 in an open position.
Figure 13:
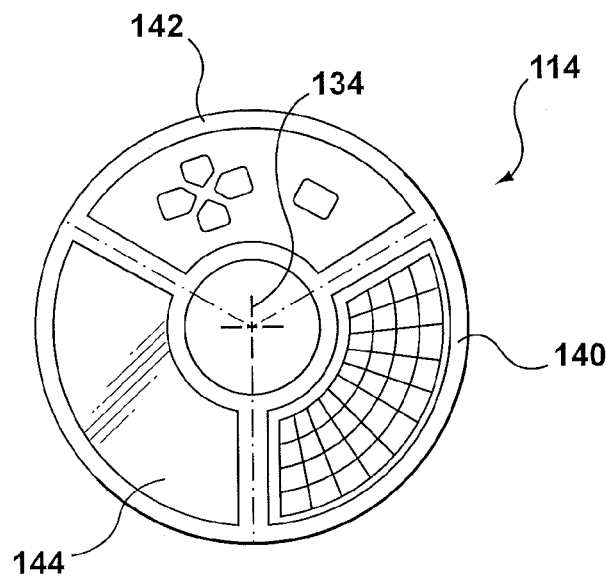
FIG. 13 is a diagrammatic top view of the bottom body of the device of FIGS. 11 and 12.

Referring now to FIGS. 11-13, a handheld electronic device 100 having a slide-and-twist style form factor in accordance with a third embodiment of the present disclosure will be described. The handheld electronic device 100 has a generally circular or cylindrical slide-and-twist-style form factor. The device 100 includes two main body parts that are movable relative to each other between a closed position and at least a first open position and second open position.

The device 100 has a slide-and-twist-style device having a first (or top) body 112 and a second (or bottom) body 114. It will be understood that while the first body is referred to as the top body 112 and that the second body is referred to as the bottom body 114, these references are used only for convenience based on a normal position in which the device 10 is held. The references to the top body 112 and bottom body 114 are not intended to be limiting. Furthermore, it will be understood that device 100 is shown schematically in the drawings for the purpose of illustration and that the thickness and size of the respective body parts may vary from that shown in the drawings and between different embodiments.

The top body 112 has first and second faces 116, 118, and a peripheral edge surface 120 interconnecting the first and second faces 116, 118. Similarly, the bottom body 114 has first and second faces 122, 124 and a peripheral edge surface 126 interconnecting the first and second faces 122, 124. The first faces 116, 122 and second faces 118, 124 of the first and second bodies 112, 114 are generally circular in shape.

The top and bottom bodies 112, 114 are connected for sliding movement of the top and bottom bodies 112, 114 relative to each other between a closed position and a first open position. The sliding movement allows the overall length of the device 100 to be extended by moving the device 100 from the closed position to first open position, or contracted by moving the device 100 from the first open position to the closed position. The sliding movement is typically linear movement as represented by the arrow 128 in FIG. 12.

As shown in the FIG. 13, the bottom body 114 has a first input device 140, second input device 142 and third input device 144 located in the first face 122. The first, second and third input devices 140, 142 are each connected to the controller of the device 100. A microphone (not shown) could also be provided in the first face 122 of the bottom body 114 when the device 100 is a communication device. The top body 112 has a speaker 136 and a display screen 138 located in the first face 116.

In the shown embodiment, the first input device 140, second input device 142 and third input device 144 occupy substantially equally sized portions of the first face 122 of the bottom body 114. In particular, in the shown embodiment substantially all of the first face 122 of the bottom body 114 is allocated to the input devices and is separated into three equal portions with the first input device 140, second input device 142 and third input device 144 occupying one of these portions. In other embodiments, the first input device 140, second input device 142 and third input device 144 may occupy less than substantially all of the first face 122 of the bottom body 114, may be different sizes, or both.

The top body 112 and bottom body 114 are also connected for rotational movement of the bottom body 114 relative to the top body 112 between the first open position and a second open position. In the first open position, a portion of the previously covered first face 122 of the bottom body 114 (identified as D1 in FIG. 12) having the first input device 140 is exposed on the first face 122 of the bottom body 114. In the second open position, a portion of the previously covered first face 122 of the bottom body 114 having the second input device 142 is exposed on the first face 122 of the bottom body 114. The bottom body 114 is also rotatable relative to the top body 112 between the first open position and a third open position. In the third open position, a portion of the previously covered first face 122 of the bottom body 114 having the third input device 144 is exposed on the first face 122 of the bottom body 114. In at least some embodiments, in the third open position the third input device 144 is exposed while the first input device 140 and second input device 142 are substantially covered by the first body 112.

The rotational movement of the device 100 is represented by arrow 130 (FIG. 12) and allows the exposed portion of the first face 122 of the bottom body 114 to be changed to show a respective one of the first input device 140, second input device 142 or third input device 144, depending upon the position of the bottom body 114.

In at least some embodiments, the bottom body 114 is rotatable in a first direction relative to the top body 112 between the first open position and the second position, and the bottom body 114 is rotatable relative in a second direction to the top body 112 between the first open position and the third open position. In some embodiments, the first direction is clockwise and the second direction is counterclockwise.

The top body 112 has a geometric centre 132 and the bottom body 114 has a geometric centre 134. When the device 100 is in the closed position, the top body 112 covers substantially all of the first face 122 of the bottom body 114. In this position, the respective geometric centres 132, 134 of the top and bottom bodies 112, 114 are substantially aligned. When the device 100 is opened to the first open position (see FIG. 12), the bottom body 114 slides linearly downwardly with respect to the top body 112 in the direction of arrow 128 such that the geometric centre 134 of the bottom body 114 is displaced linearly downwardly with respect to the geometric centre 132 of the top body 112, thereby exposing a portion of the previously covered first face 122 of the bottom body 114 and allowing the user to access the first input device 140 that was previously hidden or inaccessible, while a portion of the first face 122 remains hidden or covered.

Once the device 100 is in the first open position, the bottom body 114 can be rotated about its geometric centre 134 in either a clockwise or counterclockwise direction into the second open position or third open position. When the device 100 is rotated from the first open position into the second open position, a portion of the first face 122 of the bottom body 114 becomes exposed, thereby allowing access to the second input device 142 that was previously hidden or inaccessible in the first open position, while a portion of the first face 122 remains hidden or covered.

When the device 100 is rotated from the first open position into the third open position, a portion of the first face 122 of the bottom body 114 becomes exposed thereby allowing access to the third input device 144 that was previously hidden or inaccessible in the first open position, while a portion of the first face 122 remains hidden or covered.

In other embodiments, rather than being rotated from the first open position to either the second open position or third open position depending on the direction of rotation, the bottom body 114 is rotatable relative to the top body 112 between the first open position and the second open position. Further rotation moves the device 100 from the second open position to the third open position. The direction of rotation could be either clockwise or counterclockwise direction, depending on the embodiment. The reversing the direction allows the device 100 to be moved from the third open position to the second open position, and from the second open position to the first open position. In at least some embodiments, the device 100 can be rotated freely in 360 degrees. As with the device 10 described above in FIGS. 1 to 10, in some embodiments the device 100 could be rotated without being in a fully open position such as the first open position. It is possible that the device 100 could be rotated within the closed position in some embodiments. In other embodiments, rotation of the device 10 may be limited to when it is in a fully open position such as the first open position, second open position or third open position.

The first, second and third input devices 140, 142 and 144 may each be one of a full keyboard, reduced keyboard, numeric keypad, touchpad, touchscreen, navigation pad, Internet browser keypad, gaming keypad, media playback keypad, camera keypad or other suitable input device. Typically, the first, second and third input devices 140, 142 and 144 are each different.

The display screen 138 could be a touchscreen in some embodiments thereby providing a further input device. In addition, or instead of a touchscreen, the top body 112 could have a further input device 146 located in the first face 116 as shown in FIGS. 11 to 13. In the shown embodiment, the further input device 146 is located below the display screen 138. The touchscreen and/or further input device 146 provide input device(s) when the device 100 is in the closed position, and provides a further input device in the first, second and/or third open positions. The provision of the further input device 136 such as an additional keypad on the first face 116 of the top body 112 allows for further customization of the device 100 so as to best suit the user interfaces to the specific applications of the device 100.

In some embodiments, the first input device 140, second input device 142 and third input device 144 each comprise a keypad, wherein the keypad of the first input device 140, second input device 142 and third input device 144 are each different. In other embodiments, the first input device 140 is a full keyboard, the second input device 142 is a touchpad, touchscreen, navigation pad, Internet browser keypad, gaming keypad, media playback keypad or camera keypad, and the third input device 144 is a reduced keyboard or numeric keypad.

While not shown, any of the embodiments described in the present disclosure may be provided with arresting or resisting features which cause the device to lock or click into place when moved into one of the defined device positions (e.g., closed position, first open position, second open position, etc.). The arresting or resisting features may be detents provided by the first and second bodies of the devices. The detents are locating features which stop the device when moved into one of the defined device position and holds the device in that device position until a releasing force is applied to move it out of the current device position. The detents may also notify the user that the device has been transformed into a new form factor by providing tactile and/or audible feedback. The operation and construction of detents for electronic devices is known in the art and will only be described briefly herein.

The detents may be provided by a catch formed in the first body or second body and a complimentary shaped notch formed in the other of the first body or second body. The catch and notch are located such that, when the device is moved into one of the defined device positions, the catch in the one body grabs the notch in the other body and holds the notch via a friction force fit. A releasing force of predetermined magnitude or more is required to dislodge or remove the catch from the notch. This holds the device in the defined device position and reduces accidental changes in form factor which may otherwise occur during normal use as a result of the normal application of force when interacting with the device. The grabbing of the notch may also provide "click" feedback notifying the device user that the device has been transformed into a new form factor. The feedback may be tactile feedback from vibration caused by the catch grabbing the notch, auditory feedback from an audible sound caused by the catch grabbing the notch, or both.

In other embodiments, more or less than three input devices could be provided on the bottom body 114 of the circular slide-and-twist-style device 100.

Figure 14:
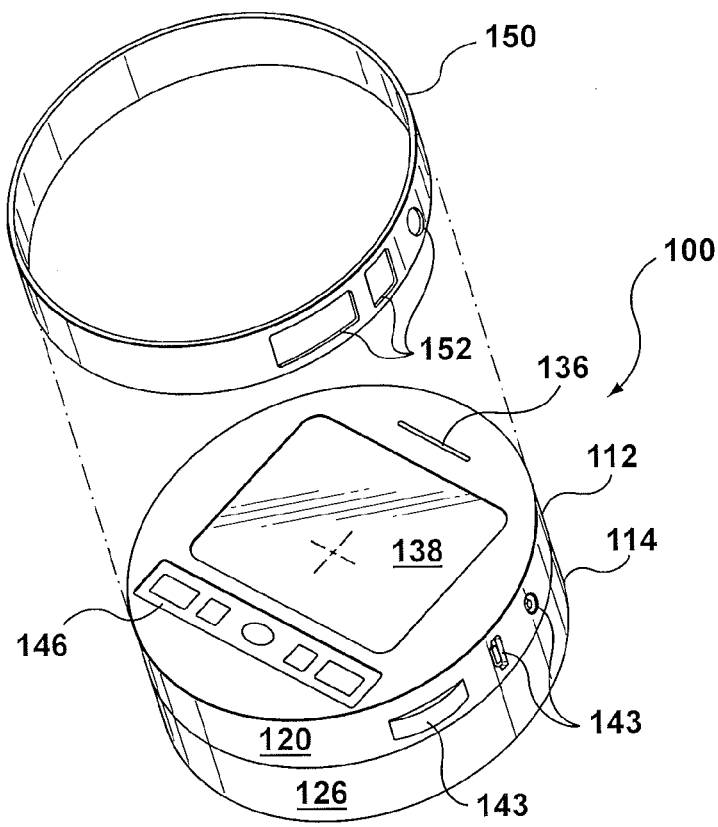
FIG. 14 is a diagrammatic exploded view of a fourth example embodiment of a slide-and-twist style handheld electronic device.

FIG. 14 illustrates a handheld electronic device 100 having a slide-and-twist style form factor in accordance with a fourth embodiment of the present disclosure. The device 100 is a circular slide-and-twist-style device 100 similar to that described above in connection with FIGS. 11 to 13. The device 100 includes a circular external (or outer) ring 150 is mounted on the top body 112 which is slidable on or rotatable about the peripheral edge surface 120 of the top body 112. While the outer ring 150 has been described in connection with the top body 112, it will be understood that this feature could also be applied to the bottom body 114 in addition to, or instead of, the top body 112.

In some embodiments, openings 152 are provided in the circular outer ring 150. Depending upon the position of the outer ring 150 relative to the peripheral edge surface 120 of the top body 112, specific areas of the peripheral edge surface 120 are exposed and accessible to the device user. Accordingly, when the top body 112 is provided with one or more interface ports 143 such as input/output ports (e.g., jacks, ports or card slots) on the peripheral edge surface 120, the outer ring 150 acts as a cover which can be rotated about the top body 112 to selectively expose or hide the interface ports 143 by aligning the respective openings 152 with the desired interface 143.

In some embodiments, the outer ring 150 could be rotated and optionally clicked by detent into a predetermined position in which one or more of the input devices of the device 100 are electronically disconnected or disabled. The one or more input devices are electronically disabled in that no input is generated even though the input device may still be physically actuated (e.g., when the input device is a keypad the keys can still be pressed but no input signal is generated). This allows the device 100 to be carried in a pocket or purse without holstering it and without generating inputs in response to accidental key presses. In this way, the outer ring 150 provides an input device lockout (such as a keypad lockout) to prevent inputs from being generated in response to accidental key presses. The lockout feature may be provided in addition to or instead of the openings 152 in the ring 150, depending on the embodiment.

In some embodiments, the lockout feature electronically disables at least the further input device(s) on the first face 116 of the top body 112 such as the keypad 146 when the outer ring is moved into the predetermined position. However, any one or more of the input devices 140, 142 and 144 could be locked in addition to or instead of the keypad 146 on the first face 116 of the top body 112, depending on the embodiment. For example, if the device 100 is in an open position and one of the input devices 140, 142 or 144 is exposed when the ring 150 is rotated, the exposed input device may be locked in addition to, or instead of, the keypad 146 on the first face 116 of the top body 112. In one example embodiment, the keypad 146 is a media player keypad which is disabled when the ring 150 is moved into the predetermined position.

In some embodiments, the predetermined position corresponds to the location of a switch (or actuator) which is activated when the outer ring 150 is moved into the predetermined position. The switch then generates an input which disconnects or disables the affected input device(s) in response to activation. The switch could be implemented by a latch belonging to a detent in the outer ring 150 which depresses or otherwise actuates a switch or button which are aligned when the outer ring 150 is moved into the predetermined position, the alignment of a pair of contacts when the outer ring 150 is moved into the predetermined position, or the detection of a magnet in the outer ring 150 by a hall effect sensor/switch in the top body 112 when the outer ring 150 is moved into the predetermined position.

Figure 15:
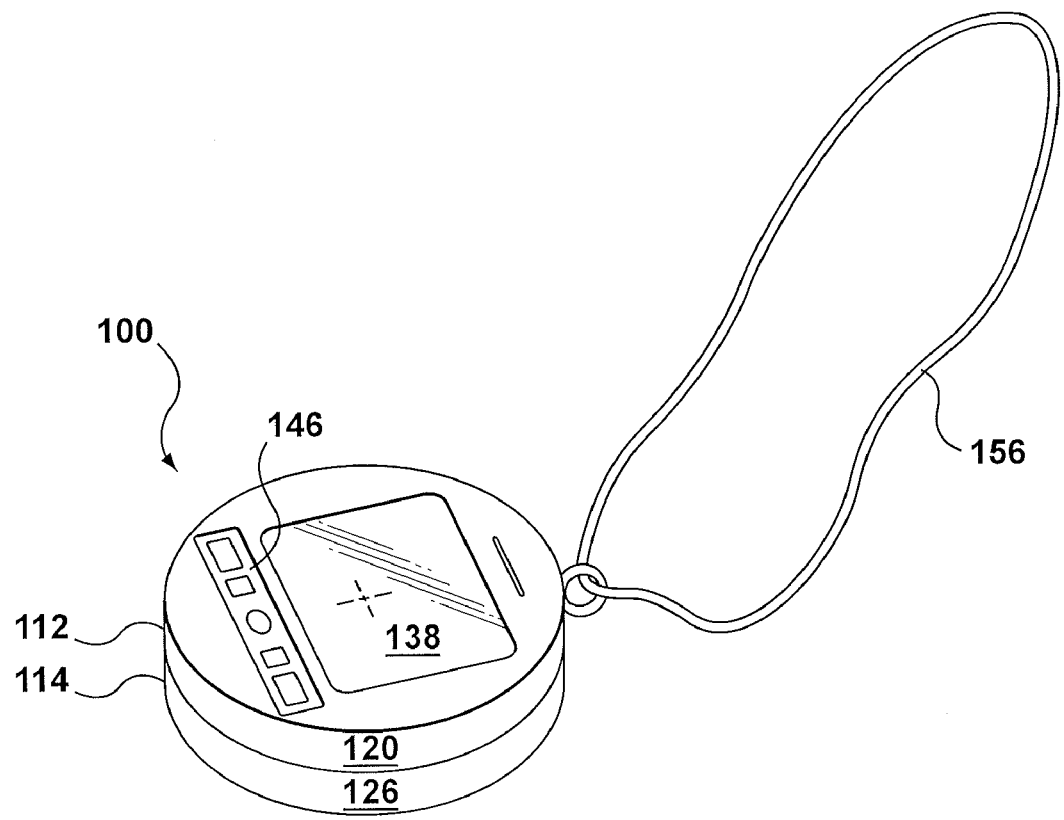
FIG. 15 is a diagrammatic perspective view of a fifth example embodiment of a slide-and-twist style handheld electronic device.

FIG. 15 illustrates a handheld electronic device 100 having a slide-and-twist style form factor in accordance with a fifth embodiment of the present disclosure. The device 100 is a circular slide-and-twist-style device 100 similar to that described above in connection with the third embodiment of FIGS. 11 to 13 and fourth embodiment of FIG. 14. The device 100 is provided with a chain or strap 156 which is secured to an opening defined in the rigid case of the top body 112 or bottom body 114, or an eyelet attached to the top body 112 or bottom body 114. The strap 156 allows the device 100 to be worn around the neck of the device user. It will be understood that a strap could be incorporated into any of the embodiments described in the present disclosure.

Figure 16:
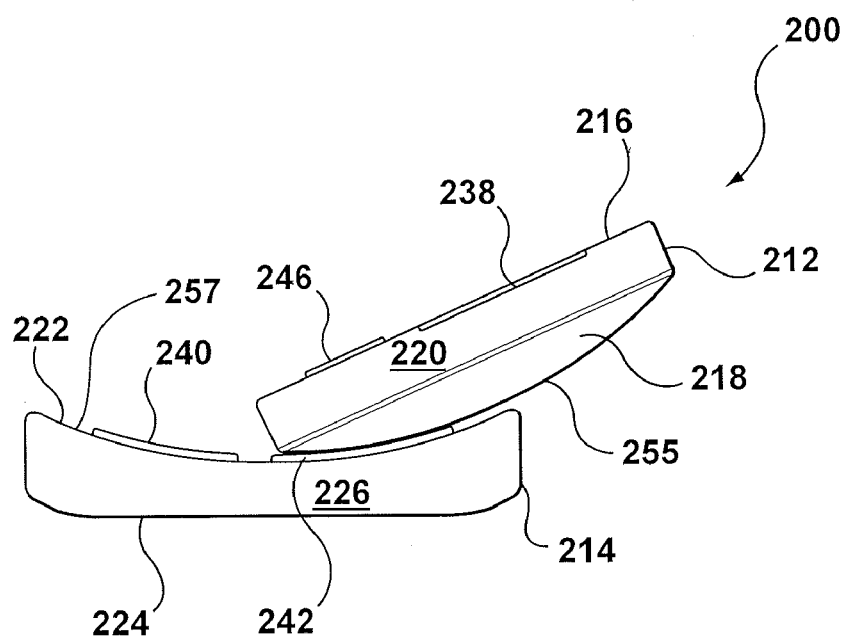
FIG. 16 is a diagrammatic side view of a sixth example embodiment of a slide-and-twist style handheld electronic device in an open position.

Referring now to FIG. 16, a handheld electronic device 200 having a slide-and-twist style form factor in accordance with a sixth embodiment of the present disclosure will be described. In this embodiment, the device 200 is in the form of a slide-and-twist-style device as described above in connection with FIGS. 1-8. However, in this example embodiment, the sliding movement occurs along an arc rather than along a linear path. The device 200 could also be adapted for a generally circular slide-and-twist-style device as described above in connection with FIGS. 11-15.

The device 200 has a first (or top) body 212 and a second (or bottom) body 214. The top body 212 has first and second faces 216 and 218 respectively, and a peripheral edge surface 220 interconnecting the first and second faces 216, 218. Similarly, the bottom body 214 has first and second faces 222 and 224 respectively, and a peripheral edge surface 226 interconnecting the first and second faces 222, 224. In the shown embodiment, the first face 216 of the top body 212 and the first face 222 of the bottom body 214 are front faces, and the second face 218 of the top body 212 and the second face 224 of the bottom body 214 are back faces.

The top and bottom bodies 212, 214 are connected for sliding movement of the top and bottom bodies 212, 214 relative to each other between the closed position and the first open position. The sliding movement allows the overall length of the device 200 to be extended by moving the device 200 from the closed position to first open position, or contracted by moving the device 200 from the first open position to the closed position. When the device 200 is in the closed position, the top body 212 covers substantially all of the first face 222 of the bottom body 214. When the device 200 is in the first open position, a first input device 240 is exposed on the first face 222 of the bottom body 214.

The top body 212 has a convex sliding surface 255 on which the second face 218 of the first body 212 is located, and the bottom body 214 has a correspondingly shaped concave sliding surface 257 on which the first face 222 of the bottom body 214 is located. The top body 212 is connected to the bottom body 214 for sliding movement between the closed position and the first open position along the convex and concave sliding surfaces 255, 257. The sliding mechanism between the top and bottom bodies 212, 214 causes the top and bottom bodies 212, 214 to move relative to each other along the arc of the corresponding convex and concave surfaces 255, 257 as opposed to a linear sliding movement as in the above-described example embodiments. The top and bottom bodies 212, 214 are also connected for rotational movement of the bottom body 214 relative to the top body 212 between the first open position and the second open position and vice versa. When the device 200 is in the second open position, a second input device 242 is exposed on the first face 222 of the bottom body 214.

When the device 200 is in the closed position, a display screen 238 provided on the first face 216 of the top body 212 lies in a first plane generally parallel to the bottom of the device 200 (the second face 224 of the bottom body 214 in FIG. 16). When the device 200 is moved from the closed position to the first open position, the display screen 238 lies in a second plane positioned at an acute angle with respect to the first plane. In this position, the display screen 238 is directed towards the device user. When the device 200 is moved from the first open position to the second open position, the angled position of the display screen 238 is maintained. The angled position of the display screen 238 facilitates viewing of the screen 238 when the device 200 is in first and second open positions, and possibly third open positions.

Figure 17:
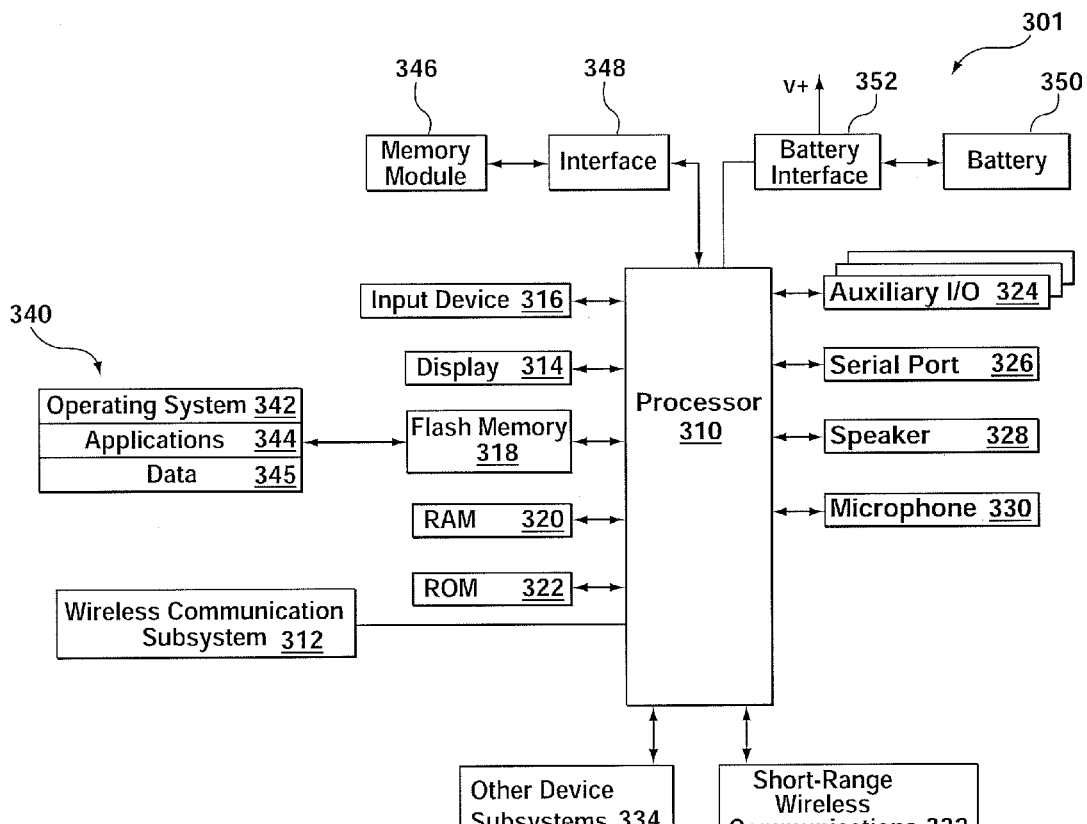
FIG. 17 is a block diagram of a mobile communication electronic device in which embodiments of the present disclosure can be applied.

Reference is now made to FIG. 17 which illustrates the electronic components of a mobile communication device 301 to which the slide-and-twist style form factor described in the present disclosure can be applied. Typically, the mobile communication device 301 is a two-way communication device having data and/or voice communication capabilities, and the capability to communicate with other computer systems, for example, via the Internet. Depending on the functionality provided by the mobile communication device 301, the device may be a multiple-mode communication device configured for both data and voice communication, a smartphone, a mobile telephone or a PDA (personal digital assistant) enabled for wireless communication, or a computer system with a wireless modem.

The mobile communication device 301 includes a controller comprising at least one processor 310 (such as a microprocessor) which controls the overall operation of the device 301. The processor 310 interacts with device subsystems such as a wireless communication subsystem 312 for exchanging radio frequency signals with a wireless network (not shown) to perform communication functions. As will be apparent to those skilled in the field of communication, the particular design of the wireless communication subsystem 312 depends on the wireless network in which the mobile communication device 301 is intended to operate.

The processor 310 interacts with additional device subsystems including a display (or display screen) 314 such as a liquid crystal display (LCD) screen, input devices 316 comprising any combination of two or more of a keyboard, keypad, touchpad, touchscreen, navigation pad, Internet browser keypad, gaming keypad, media playback keypad, camera keypad or other suitable input device (including, possibly, two or more of the same type of input device), flash memory 318, random access memory (RAM) 320, read only memory (ROM) 322, auxiliary input/output (I/O) subsystems 324, data port 326 such as a serial data port, speaker 328, microphone 330, short-range communication subsystem 332, and other device subsystems generally designated as 334.

The processor 310 operates under stored program control and executes software modules 340 stored in memory such as persistent memory, for example, in the flash memory 318. As illustrated in FIG. 17, the software modules 340 comprise operating system software 342 and software applications 344. Those skilled in the art will appreciate that the software modules 340 or parts thereof may be temporarily loaded into volatile memory such as the RAM 320. The RAM 320 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the mobile communication device 301 also includes a removable memory card or memory module 346 (typically comprising flash memory) and a memory card interface 348. The memory card 346 is inserted in or connected to the memory card interface 348 of the mobile communication device 301 in order to operate in conjunction with the wireless network.

The mobile communication device 301 stores data 345 in an erasable persistent memory, which in one example embodiment is the flash memory 318. In various embodiments, the data 345 includes service data comprising information required by the mobile communication device 301 to establish and maintain communication with the wireless network. The data 345 may also include user application data such as email messages, address book and contact information, calendar and schedule information, notepad documents, image files, and other commonly stored user information stored on the mobile communication device 301 by its user, and other data. The data 345 stored in the persistent memory (e.g. flash memory 318) of the mobile communication device 301 may be organized, at least partially, into a number of databases each containing data items of the same data type or associated with the same application. For example, email messages, contact records, and task items may be stored in individual databases within the device memory.

The mobile communication device 301 also includes a battery 350 as a power source, which is typically one or more rechargeable batteries that may be charged, for example, through charging circuitry coupled to a battery interface such as the serial data port 326. The battery 350 provides electrical power to at least some of the electrical circuitry in the mobile communication device 301 and the battery interface 352 provides a mechanical and electrical connection for the battery 350. The battery interface 352 is coupled to a regulator (not shown) which provides power V+ to the circuitry of the mobile communication device 301.

The short-range communication subsystem 332 provides for communication between the mobile communication device 301 and different systems or devices, which need not necessarily be similar devices. For example, the subsystem 332 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 301 during or after manufacture. Additional applications and/or upgrades to the operating system 342 or software applications 344 may also be loaded onto the mobile communication device 301 through the wireless network, the auxiliary I/O subsystem 324, the serial port 326, the short-range communication subsystem 332, or other suitable subsystem 334. The downloaded programs or code modules may be permanently installed, for example, written into the program memory (i.e. the flash memory 318), or written into and executed from the RAM 320 for execution by the processor 310 at runtime. Such flexibility in application installation increases the functionality of the mobile communication device 301 and may provide enhanced on-device functions, communication-related functions, or both. For example, secure communication applications may enable electronic commerce functions and other such financial transactions to be performed using the mobile communication device 301.

The mobile communication device 301 may provide two principal modes of communication: a data communication mode and/or a voice communication mode, although additional modes of operation for the mobile communication device 301 are contemplated. In the data communication mode, a received data signal such as a text message, an email message, or Web page download will be processed by the communication subsystem 312 and input to the processor 310 for further processing. For example, a downloaded Web page may be further processed by a browser application or an email message may be processed by an email message messaging application and output to the display 314. A user of the mobile communication device 301 may also compose data items, such as email messages, for example, using the input devices in conjunction with the display 314. These composed items may be transmitted through the communication subsystem 312 over the wireless network.

In the voice communication mode, the mobile communication device 301 provides telephony functions and operates as a typical cellular phone. The overall operation is similar, except that the received signals would be output to the speaker 328 and signals for transmission would be generated by a transducer such as the microphone 330. The telephony functions are provided by a combination of software/firmware (i.e., the voice communication module) and hardware (i.e., the microphone 330, the speaker 328 and input devices). Alternative voice or audio I/O subsystems, such as a voice message recording subsystem, may also be implemented on the mobile communication device 301. Although voice or audio signal output is typically accomplished primarily through the speaker 328, the display screen 314 may also be used to provide an indication of the identity of a calling party, duration of a voice call, or other voice call related information.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A handheld electronic device, comprising:
a controller;
a first input device connected to the controller;
a second input device connected to the controller;
a first body having a first face and a second face;
a second body having a first face and a second face, the first and second input devices being located on the first face of the second body;
the first body being connected to the second body for sliding movement between a closed position and a first open position, wherein in the closed position the first body covers at least a portion of the second body, and wherein in the first open position the first input device is exposed on the first face of the second body; and
wherein the second body is rotatable relative to the first body between the first open position and a second open position, wherein in the second open position the second input device is exposed on the first face of the second body;
wherein in the second open position the second input device is exposed while the first input device is substantially covered by the first body.

2. The device of claim 1, wherein in the closed position the first body covers substantially all of the first face of the second body.

3. The device of claim 1, wherein in the closed position the first input device and second input device are substantially covered by the first body.

4. The device of claim 1, wherein in the first open position the first input device is exposed while the second input device is substantially covered by the first body.

5. The device of claim 1, wherein the closed position is associated with a first mode of operation, the first open position is associated with a second mode of operation, and the second open position is associated with a third mode of operation; and
wherein the controller is configured to detect changes in device position and automatically change the operational mode of the device in accordance with the device position following a detected change in device position.

6. A handheld electronic device, comprising:
a controller;
a first input device connected to the controller;
a second input device connected to the controller;
a first body having a first face and a second face;
a second body having a first face and a second face, the first and second input devices being located on the first face of the second body;
the first body being connected to the second body for sliding movement between a closed position and a first open position, wherein in the closed position the first body covers at least a portion of the second body, and wherein in the first open position the first input device is exposed on the first face of the second body;
wherein the second body is rotatable relative to the first body between the first open position and a second open position, wherein in the second open position the second input device is exposed on the first face of the second body; and wherein the first input device and second input device are located on the first face of the second body at opposite ends thereof, wherein the first input device has a working orientation rotated 180 degrees with respect to a working orientation of the second input device.

7. The device of claim 1, wherein the second body rotates about its geometric centre, and wherein the first input device is substantially equal in size to the second input device.

8. The device of claim 1, wherein the second body rotates about a pivot axis linearly offset from a geometric centre of the second body, and wherein one of the first and second input devices is smaller in size than the other of the first and second input devices.

9. The device of claim 1, wherein a display screen is provided on the first face of the first body, and the first and second input device are each one of a full keyboard, reduced keyboard, numeric keypad, touchpad, touchscreen, navigation pad, Internet browser keypad, gaming keypad, media playback keypad or camera keypad; and wherein the first and second input device are different.

10. The device of claim 1, wherein the first input device is a full keyboard, reduced keyboard or numeric keypad, and the second input device is a navigation pad, Internet browser keypad, gaming keypad, media playback keypad or camera keypad.

11. The device of claim 9, wherein the display screen is a touchscreen providing a further input device.

12. A handheld electronic device, comprising:
a controller;
a first input device connected to the controller;
a second input device connected to the controller;
a first body having a first face and a second face;
a second body having a first face and a second face, the first and second input devices being located on the first face of the second body;
the first body being connected to the second body for sliding movement between a closed position and a first open position, wherein in the closed position the first body covers at least a portion of the second body, and wherein in the first open position the first input device is exposed on the first face of the second body; and
a third input device located on the first face of the second body and connected to the controller;
wherein the second body is rotatable relative to the first body between the first open position and a second open position, wherein in the second open position the second input device is exposed on the first face of the second body;
wherein the second body is rotatable relative to the first body between the first open position and a third open position, wherein in the third open position the third input device is exposed on the first face of the second body.

13. The device of claim 12, wherein in the third open position the third input device is exposed while the first input device and second input device are substantially covered by the first body.

14. The device of claim 12, wherein the second body is rotatable in a first direction relative to the first body between the first open position and the second position, and wherein the second body is rotatable relative in a second direction to the first body between the first open position and the third open position.

15. The device of claim 14, wherein the first direction is clockwise and the second direction is counterclockwise.

16. The device of claim 12, wherein the first input device, second input device, and third input device each comprise a keypad, wherein the keypad of the first input device, second input device, and third input device are each different.

17. The device of claim 12, further comprising a further input device on the first face of the first body.

18. A handheld electronic device, comprising:
a controller;
a first input device connected to the controller;
a second input device connected to the controller;
a first body having a first face and a second face;
a second body having a first face and a second face, the first and second input devices being located on the first face of the second body;
the first body being connected to the second body for sliding movement between a closed position and a first open position, wherein in the closed position the first body covers at least a portion of the second body, and wherein in the first open position the first input device is exposed on the first face of the second body; and
wherein the first and second bodies are generally cylindrical in shape, the first and second faces of the first and second bodies being generally circular in shape;
a rotatable outer ring disposed on one of the first and second bodies, the outer ring being rotatable about a peripheral edge surface thereof and having openings formed therein for selectively exposing one or more interface ports located in the peripheral edge surface.

19. The device of claim 17, wherein the first and second bodies are generally cylindrical in shape, the first and second faces of the first and second bodies being generally circular in shape, the device further comprising a rotatable outer ring disposed on the one of the first and second bodies, the outer ring having a predetermined position in which at least one of the first, second or further input devices is disabled.

20. The device of claim 19, wherein the further input device is disabled when the outer ring is moved into the predetermined position.

21. A handheld electronic device, comprising:
a controller;
a first input device connected to the controller;
a second input device connected to the controller;
a first body having a first face and a second face;
a second body having a first face and a second face, the first and second input devices being located on the first face of the second body;
the first body being connected to the second body for sliding movement between a closed position and a first open position, wherein in the closed position the first body covers at least a portion of the second body, and wherein in the first open position the first input device is exposed on the first face of the second body;
wherein the first body has a convex sliding surface on which the second face of the first body is located, and the second body has a correspondingly shaped concave sliding surface on which the first face of the second body is located, wherein the first body is connected to the second body for sliding movement between the closed position and the first open position along the convex and concave sliding surfaces;
wherein the first face of the first body lies in a first plane in the closed position, the first face of the first body lying in a second plane in the first open position, the second plane being disposed at an acute angle with respect to the first plane.

22. The device of claim 21, wherein the first face of the first body remains in the second plane when the device is in the second open position.

23. The device of claim 1, wherein the second body is rotatable 180 degrees relative to the first body between the first open position and a second open position.

24. The device of claim 18, further comprising:
a further input device on the first face of the first body;
wherein the outer ring has a predetermined position in which at least one of the first, second or further input devices is disabled.

25. The device of claim 24, wherein the further input device is disabled when the outer ring is moved into the predetermined position.

* * * * *